United States Patent
Chen

(10) Patent No.: US 6,562,390 B1
(45) Date of Patent: May 13, 2003

(54) PROCESS FOR THE PREPARATION OF SHRIMP PRODUCT

(76) Inventor: Hann-Kuang Chen, 7F, No. 90, Chien-Kuo 1st Rd., Lin-Ya Dist., Kaohsiung City (TW)

( * ) Notice: Subject to any disclaimer, the term of this patent is extended or adjusted under 35 U.S.C. 154(b) by 0 days.

(21) Appl. No.: 10/199,289

(22) Filed: Jul. 18, 2002

(51) Int. Cl.[7] ............................................. A22C 29/00
(52) U.S. Cl. ................ 426/523; 426/115; 426/129; 426/393; 426/396; 426/643
(58) Field of Search ................................ 426/523, 524, 426/643, 115, 129, 393, 396

(56) References Cited

U.S. PATENT DOCUMENTS 5,431,938 A * 7/1995 Kou ........................... 426/643
6,042,856 A * 3/2000 Sagan et al. ................. 426/129

* cited by examiner

Primary Examiner—George C. Yeung
(74) Attorney, Agent, or Firm—Townsend and Townsend and Crew LLP

(57) ABSTRACT

A process for the preparation of a peeled and cooked shrimp product includes the steps of placing peeled raw shrimps side-by-side on a shape setting platter, covering the shrimps with a mesh, cooking the shrimps, removing the mesh from the cooked shrimps, covering the shrimps with a cover, turning assembly of the cover and the shape setting platter upside down, removing the shape setting platter, superimposing a packaging platter on the cover, and turning assembly of the cover and the packaging platter upside down.

1 Claim, 6 Drawing Sheets

PROCESS FOR THE PREPARATION OF SHRIMP PRODUCT

BACKGROUND OF THE INVENTION

1. Field of the Invention

This invention relates to a process for the preparation of shrimp product, more particularly to a process for the preparation of shrimp product which includes peeled and cooked frozen shrimps placed on a packaging platter.

2. Description of the Related Art

FIG. 1 illustrates consecutive steps of a conventional method for preparing a frozen, peeled and cooked shrimp product. The method includes the step of orderly placing peeled raw shrimps on a tray with a mesh that covers the shrimps for positioning the shrimps on the tray. The tray is subsequently subjected to heat to cook the peeled shrimps. The cooked shrimps are then poured into a container after the mesh has been removed, and are rearranged on a packaging platter for subsequent freezing and packaging.

As illustrated in FIGS. 2 and 3, the aforesaid packaging platter normally includes a body 19 having an annular concave portion 190 and an annular convex portion 191 in conjunction with the concave portion 190. The cooked shrimps 2 are placed side-by-side on the packaging platter along radial directions. The body portion of each of the cooked shrimps 2 is laid on the convex portion 191 along the curved surface thereof in order to be well positioned on the packaging platter. The head portion of each of the cooked shrimps 2 extends curvedly and downwardly from the body portion and is disposed in the concave portion 190. Since the shrimps 2 curl in various degrees and directions upon cooking, a large height (h) of the convex portion 191 and a large width (w) of the concave portion 190 would be required to permit accommodation of different sizes of the cooked shrimps 2 on the packaging platter. The large height of convex portion 191 and the large width of the concave portion 190 increases the size of the packaging platter, and thus decreases the amount of the frozen cooked shrimps 2 that can be stored in a freezing room or in a container on a vehicle. Moreover, when rearranging the cooked shrimps 2 on the packaging platter, large gaps are formed among adjacent shrimps 2 due to irregular curling of the shrimps 2 during cooking. As a result, differing amounts of the cooked shrimps 2 for the same size of the packaging platters may occur, which is undesirable for manufacturers.

A further disadvantage of the conventional method may take place during the transport or handling of the shrimp product. After freezing, because of the presence of the large gaps between adjacent shrimps 2 on the packaging platter, frost formed in the large gaps cannot provide a strong connection for holding the cooked shrimps 2 tightly together. As a result, the cooked shrimps 2 can loosen during transport or handling, which, in turn, adversely affects the quality of the shrimp product. Furthermore, removal of the cooked shrimps 2 from the tray and rearranging of the cooked shrimps 2 on the packaging platter are laborious and tend to increase the risk of contamination of the cooked shrimps 2.

SUMMARY OF THE INVENTION

Therefore, it is an object of the present invention to provide a process for the preparation of a frozen, peeled and cooked shrimp product that is capable of overcoming the aforesaid disadvantages of the prior art.

Accordingly, a process for the preparation of a frozen, peeled and cooked shrimp product of the present invention comprises the steps of: (a) providing a shape setting platter with a circumferentially extending concave portion and a circumferentially extending convex portion in conjunction with the concave portion; (b) placing peeled raw shrimps side-by-side on the shape setting platter, each of the raw shrimps being laid from the concave portion to the convex portion so as to impart the raw shrimps with a shape conforming to contour of the concave and convex portions; (c) covering the raw shrimps with a mesh that is flexed for contact with the raw shrimps so as to maintain shape of each of the raw shrimps on the shape setting platter when the shape setting platter is heated; (d) heating the shape setting platter to cook the raw shrimps; (e) removing the mesh from the cooked shrimps on the shape setting platter, and subsequently superimposing a cover on the shape setting platter in such a manner that a concave inner surface of the cover is in contact with the cooked shrimps, the inner surface having an impression that corresponds to that imparted by the convex and concave portions of the shape setting platter; (f) turning assembly of the cover, the shape setting platter, and the cooked shrimps formed in step (e) upside down to transfer the cooked shrimps onto the cover from the shape setting platter, and removing the shape setting platter from the cover; (g) superimposing a packaging platter, which has a shape and size essentially the same as those of the shape setting platter, on the cover, and turning assembly of the cover, the packaging platter and the cooked shrimps upside down to transfer the cooked shrimps onto the packaging platter from the cover; (h) freezing the cooked shrimps on the packaging platter; and (i) packaging assembly of the cover, the packaging platter and the frozen cooked shrimps formed in step (h).

BRIEF DESCRIPTION OF THE DRAWINGS

In drawings which illustrate an embodiment of the invention.

DETAILED DESCRIPTION OF THE PREFERRED EMBODIMENT

Figure 1:
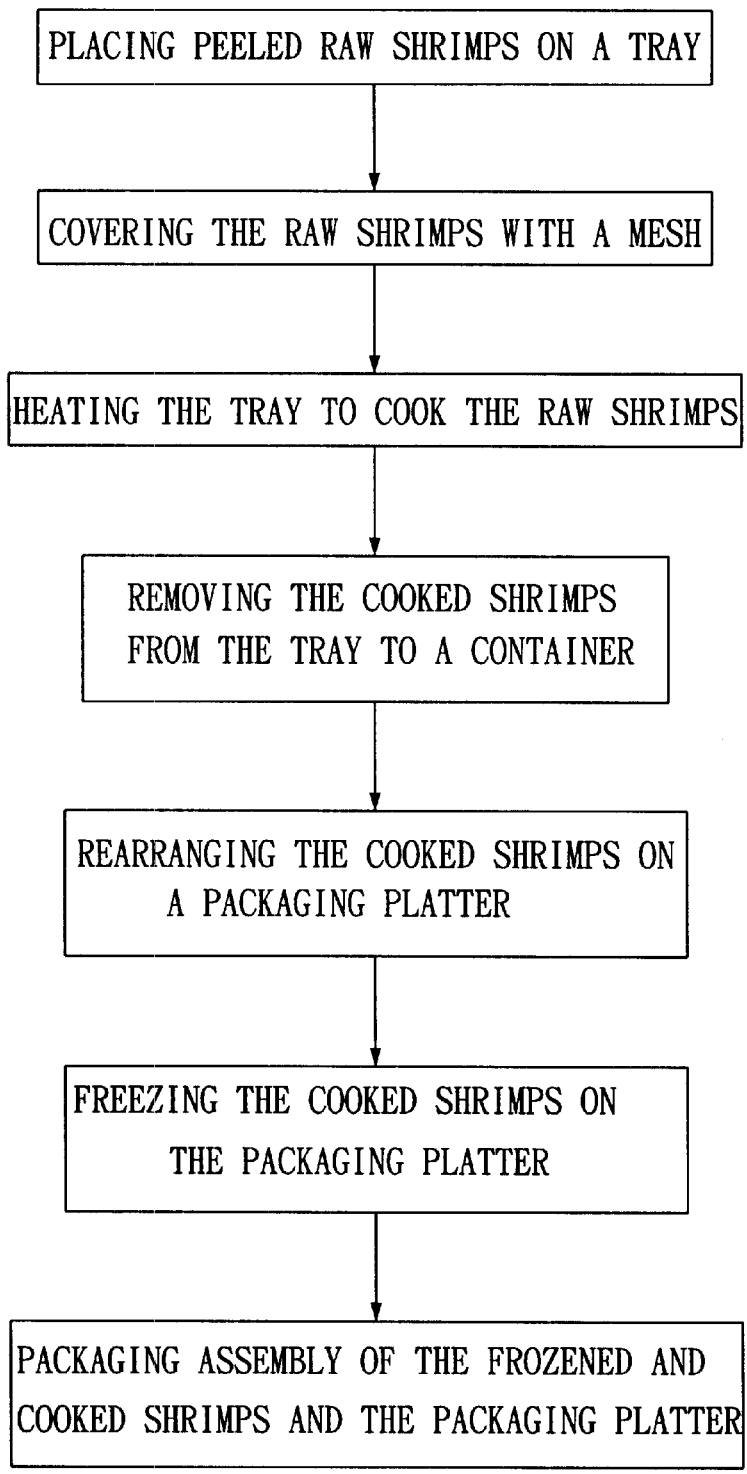
FIG. 1 is a flow diagram illustrating consecutive steps of a conventional method for preparing shrimp product.
Figure 2:
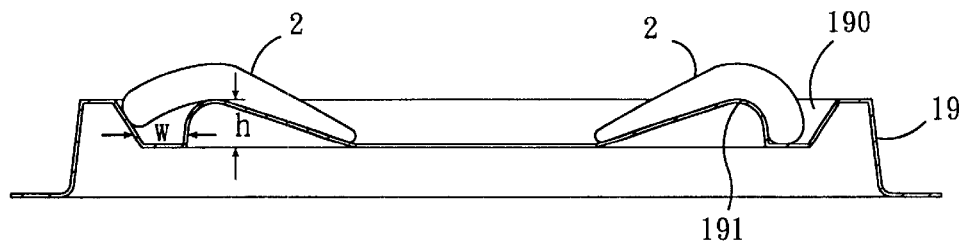
FIG. 2 is a sectional view of a packaging platter employed in the conventional method.
Figure 3:
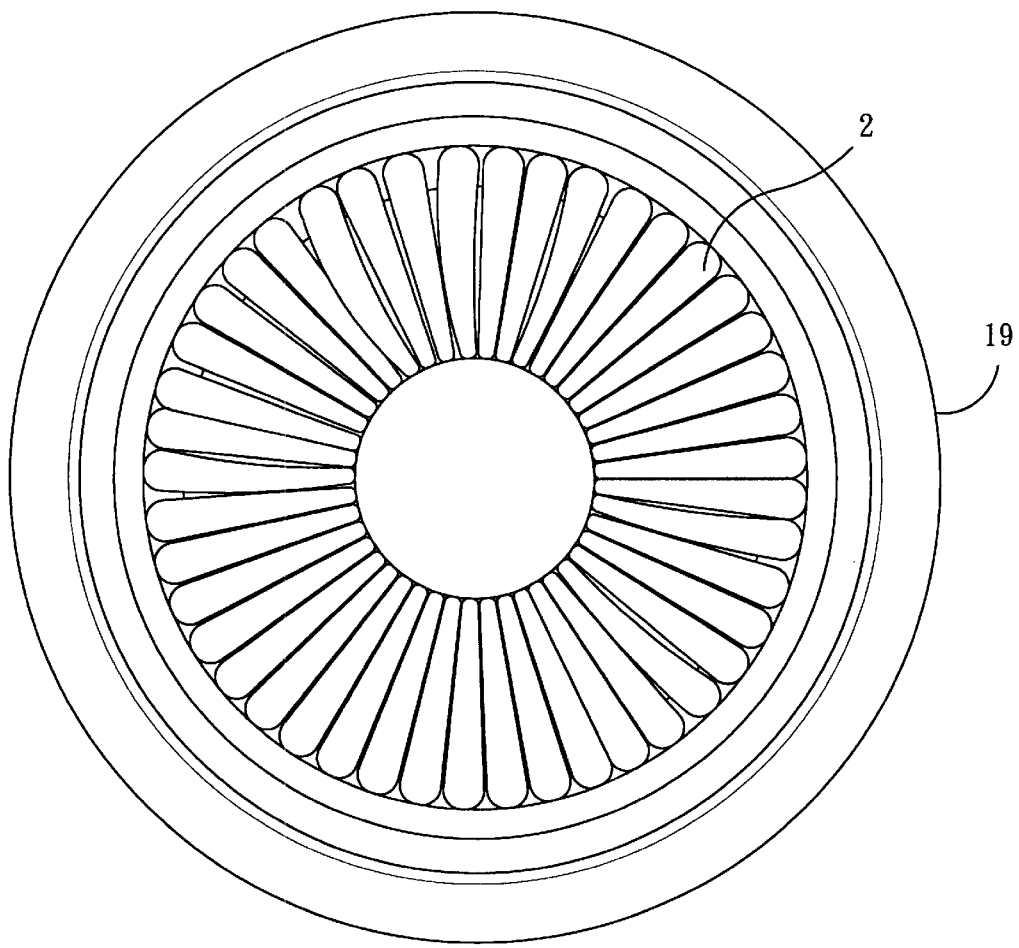
FIG. 3 is a top view illustrating peeled and cooked shrimps laid on the packaging platter of FIG. 2 according to the conventional method.
Figure 4:
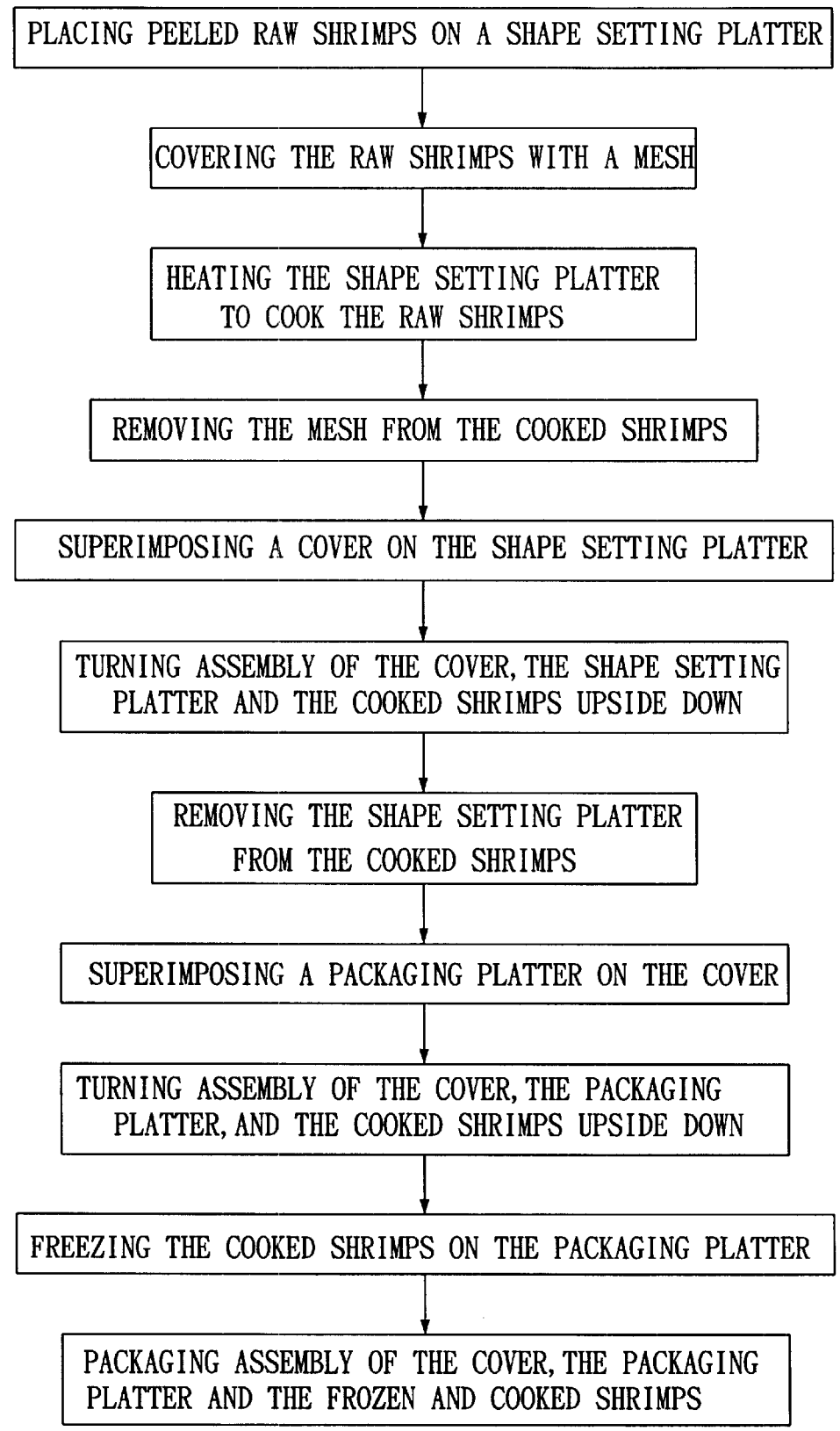
FIG. 4 is a flow diagram to illustrate consecutive steps of a preferred embodiment of a process of this invention for the preparation of shrimp product.
Figure 5:
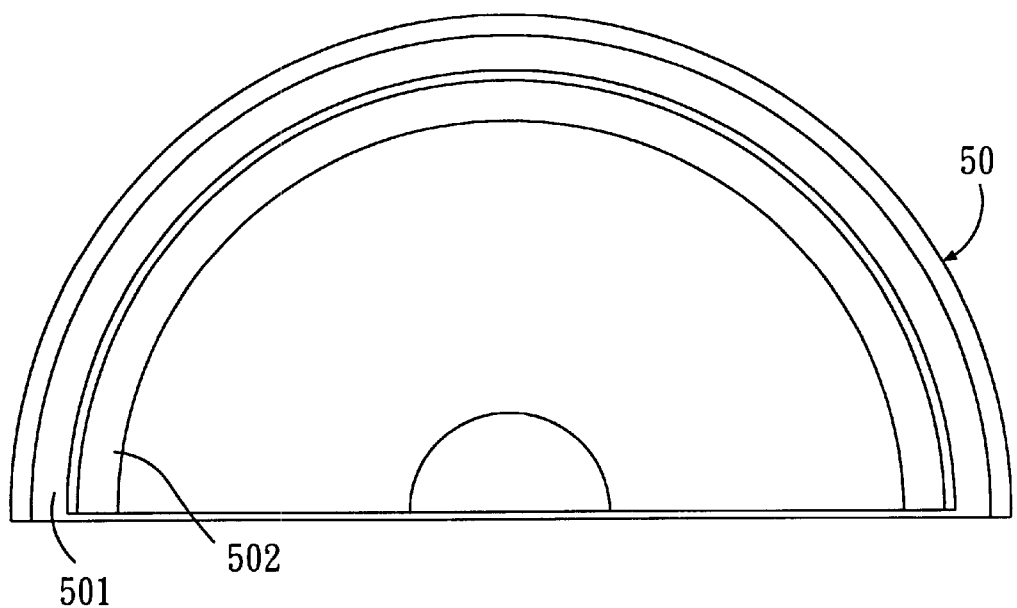
FIG. 5 is a top view of a shape setting platter employed in the method of this invention.
Figure 6:
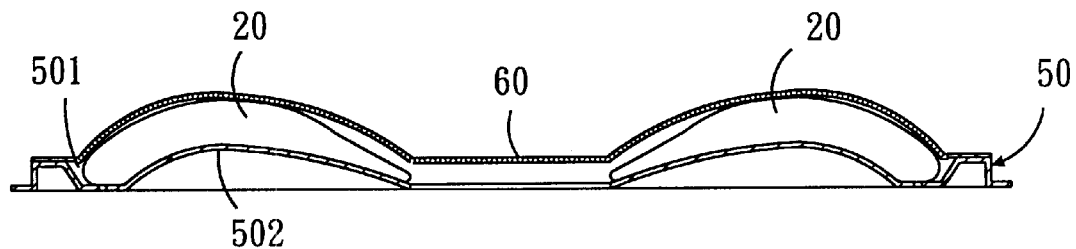
FIG. 6 is a sectional view to illustrate how peeled raw shrimps are placed on the shape setting platter and are covered by a mesh thereon according to the process of this invention.
Figure 7A:
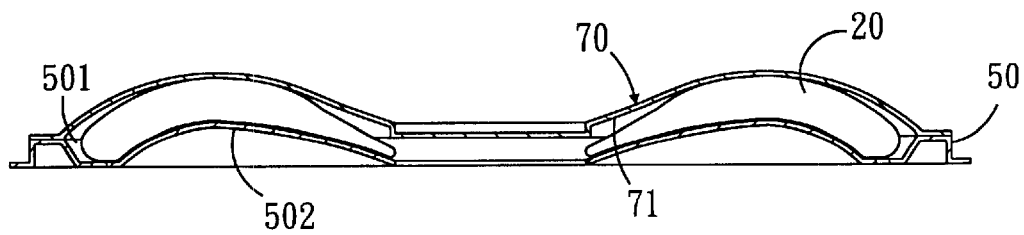
FIGS. 7A to 7C are sectional views to illustrate how the cooked shrimps are transferred from the shaped setting plate to a packaging platter according to the method of this invention.
Figure 7B:
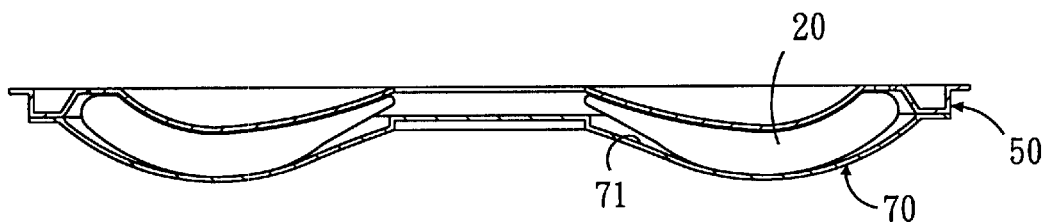
Figure 7C:
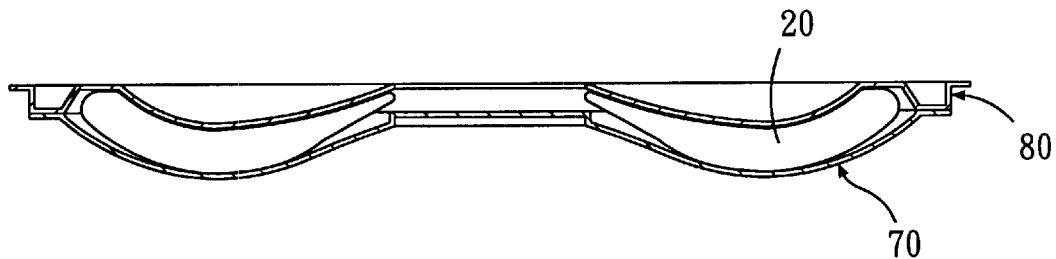
Figure 8:
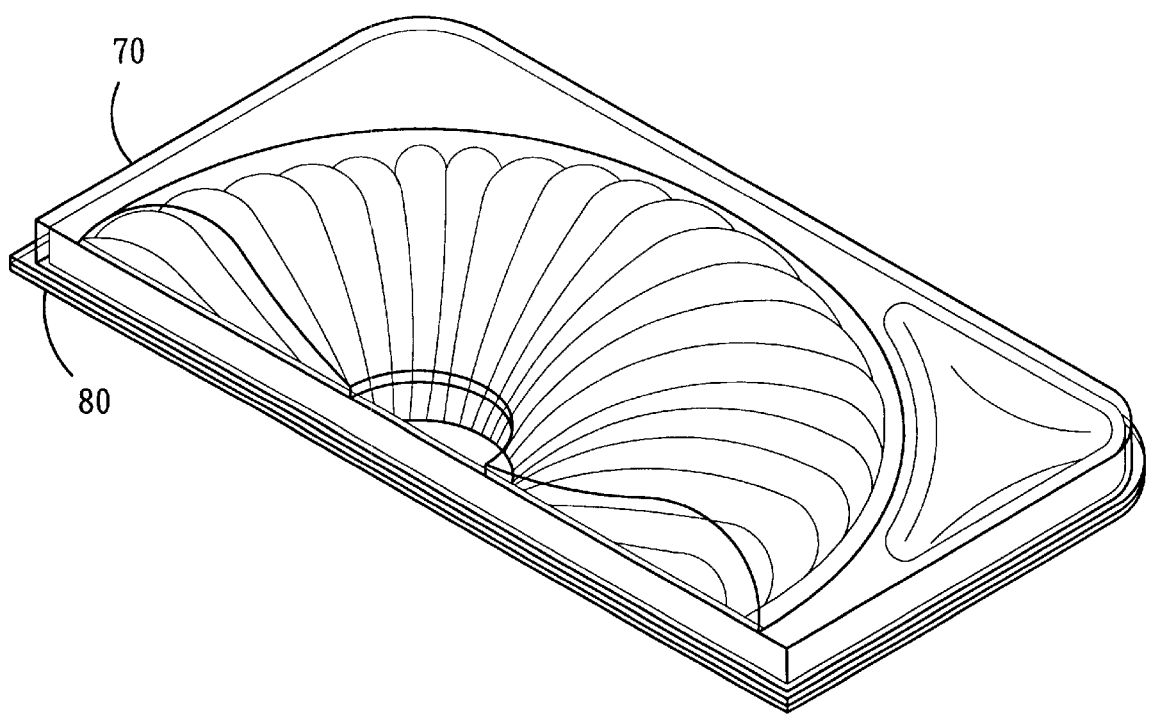
FIG. 8 is a perspective view of the shrimp product prepared according to the method of this invention.

FIG. 4 illustrates a flow diagram of a preferred embodiment of a process of this invention for the preparation of shrimp product.

Referring now to FIGS. 5, 6, 7A to 7C, and 8, in combination with FIG. 4, the process includes the steps of: (a) providing a shape setting platter 50 with a circumferentially extending concave portion 501 and a circumferentially extending convex portion 502 in conjunction with the concave portion 501 (see FIGS. 5 and 6); (b) placing peeled raw shrimps 20 side-by-side on the shape setting platter 50 (see FIG. 6), each of the raw shrimps 20 being laid from the concave portion 501 to the convex portion 502 so as to impart the raw shrimps 20 with a shape conforming to contour of the concave and convex portions 501, 502; (c) covering the raw shrimps 20 with a mesh 60 that is flexed for contact with the raw shrimps 20 (see FIG. 6) so as to maintain shape of each of the raw shrimps 20 on the shape setting platter 50 when the shape setting platter 50 is heated; (d) heating the shape setting platter 50 to cook the raw shrimps 20; (e) removing the mesh 60 from the cooked shrimps 20 on the shape setting platter 50, and subsequently superimposing a cover 70 on the shape setting platter 50 (see FIG. 7A) in such a manner that a concave inner surface 71 of the cover 70 is in contact with the cooked shrimps 20, the inner surface 71 having an impression that corresponds to that imparted by the convex and concave portions 501, 502 of the shape setting platter 50, i.e. substantially a mirror image; (f) turning assembly of the cover 70, the shape setting platter 50 and the cooked shrimps 20 formed in step (e) upside down to transfer the cooked shrimps 20 onto the cover 70 from the shape setting platter 50 (see FIG. 7B) and removing the shape setting platter 50 from the cover 70; (g) superimposing a packaging platter 80, which has a shape and size essentially the same as those of the shape setting platter 50, on the cover 70 (see FIG. 7C), and turning assembly of the cover 70, the packaging platter 80 and the cooked shrimps 20 upside down to transfer the cooked shrimps 20 onto the packaging platter 80 from the cover 70 (see FIG. 8); (h) freezing the cooked shrimps 20 on the packaging platter 80; and (i) packaging assembly of the cover 70, the packaging platter 80 and the frozen cooked shrimps 20 formed in step (h). The shape setting platter 50 is made from a material that can withstand heat during the cooking of the peeled raw shrimps 20. The packaging platter 80 is preferably made from plastic material which is easy to be shaped so as to have the same shape as the shape setting platter 50. The shrimps 20 on the shape setting platter 50 become tightly lined up after cooking the shrimps 20. As a consequence, gaps between adjacent cooked shrimps 20 on the shape setting platter 50 are relatively small.

By using the cover 70 and the packaging platter 80 according to the method of this invention, the cooked shrimps 20 can be easily transferred from the shape setting platter 50 to the packaging platter 80 without affecting the arrangement of the cooked shrimps 20, thereby eliminating the aforesaid drawbacks as encountered in the prior art.

With the invention thus explained, it is apparent that various modifications and variations can be made without departing from the spirit of the present invention. It is therefore intended that the invention be limited only as recited in the appended claims.

I claim:

1. A process for the preparation of a frozen, peeled and cooked shrimp product, comprising the steps of:

(a) providing a shape setting platter with a circumferentially extending concave portion and a circumferentially extending convex portion in conjunction with the concave portion;

(b) placing peeled raw shrimps side-by-side on the shape setting platter, each of the raw shrimps being laid from the concave portion to the convex portion so as to impart the raw shrimps with a shape conforming to contour of the concave and convex portions;

(c) covering the raw shrimps with a mesh that is flexed for contact with the raw shrimps so as to maintain shape of each of the raw shrimps on the shape setting platter when the shape setting platter is heated;

(d) heating the shape setting platter to cook the raw shrimps;

(e) removing the mesh from the cooked shrimps on the shape setting platter, and subsequently superimposing a cover on the shape setting platter in such a manner that a concave inner surface of the cover is in contact with the cooked shrimps, the inner surface having an impression that corresponds to that imparted by the convex and concave portions of the shape setting platter;

(f) turning assembly of the cover, the shape setting platter, and the cooked shrimps formed in step (e) upside down to transfer the cooked shrimps onto the cover from the shape setting platter, and removing the shape setting platter from the cover;

(g) superimposing a packaging platter, which has a shape and size essentially the same as those of the shape setting platter, on the cover, and turning assembly of the cover, the packaging platter and the cooked shrimps upside down to transfer the cooked shrimps onto the packaging platter from the cover;

(h) freezing the cooked shrimps on the packaging platter; and (i) packaging assembly of the cover, the packaging platter and the frozen cooked shrimps formed in step (h).

* * * * *